(12) United States Patent
Smallwood (10) Patent No.: US 10,174,843 B1
(45) Date of Patent: Jan. 8, 2019

(54) SINGLE PIECE REDUNDANT, BI-DIRECTIONAL, SEAL DAMAGE PREVENTION PRESSURE SEAL

(71) Applicant: The Boeing Company, Chicago, IL (US)

(72) Inventor: Drew L. Smallwood, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/397,671

(22) Filed: Jan. 3, 2017

(51) Int. Cl.
  *E06B 3/988* (2006.01)
  *F16J 15/02* (2006.01)
  *E06B 3/54* (2006.01)
  *E06B 7/22* (2006.01)

(52) U.S. Cl.
  CPC ........... *F16J 15/022* (2013.01); *E06B 3/5454* (2013.01); *E06B 7/22* (2013.01); *E06B 2003/5463* (2013.01)

(58) Field of Classification Search
  CPC ......... F16J 15/022; E06B 3/5454; E06B 7/22; E06B 2003/5463
  USPC ....................... 52/204.71; 428/122
  See application file for complete search history.

(56) References Cited

U.S. PATENT DOCUMENTS

| | | | | |
|---|---|---|---|---|
| 1,680,315 A | * | 8/1928 | Bailey | B60J 10/74 428/122 |
| 1,842,586 A | * | 1/1932 | Davidson | B60J 10/74 156/214 |
| 2,746,103 A | * | 5/1956 | Bright | E06B 3/68 49/490.1 |
| 3,040,847 A | * | 6/1962 | Webster | E04B 2/7854 52/204.597 |
| 3,310,928 A | * | 3/1967 | Weimar | B60J 10/26 428/122 |
| 3,807,978 A | * | 4/1974 | Niemanns | B60J 10/17 49/441 |
| 4,334,700 A | * | 6/1982 | Adell | B60R 13/043 280/770 |
| 4,443,508 A | * | 4/1984 | Mehl | B60J 10/17 16/86 A |
| 4,472,469 A | * | 9/1984 | Thies | B60J 10/16 428/122 |

(Continued)

OTHER PUBLICATIONS

Sealing & Shielding Capabilities Guide, Parker Hannifin Corporation, Apr. 2014, http://www.parker.com/literature/Seal%20Group/PSG%205000.pdf.

(Continued)

*Primary Examiner* — Basil S Katcheves
(74) *Attorney, Agent, or Firm* — McDonnell Boehnen Hulbert & Berghoff LLP (57) ABSTRACT

An example seal for use with a laminated window is described. The seal includes a first end formed from a first material and a second end formed from the first material, with the first material being compressible when a pressure force is applied to the first material. The seal also includes a connection portion positioned between the first end and the second end. At least some of the connection portion is formed from a second material having a greater indentation hardness than an indentation hardness of the first material. An example method for installing a seal is also described.

20 Claims, 6 Drawing Sheets

(56) References Cited

U.S. PATENT DOCUMENTS

| | | | | |
|---|---|---|---|---|
| 4,690,412 | A * | 9/1987 | Tuckley | B60J 10/33 277/642 |
| 4,695,499 | A * | 9/1987 | Whitener | B60J 10/33 428/122 |
| 4,778,705 | A * | 10/1988 | Kuwabara | A47G 27/0431 428/122 |
| 4,835,031 | A * | 5/1989 | Schroder | B29C 47/003 428/122 |
| 4,943,466 | A * | 7/1990 | Bareich | B60J 10/75 428/122 |
| D328,187 | S * | 7/1992 | Saurette | 294/171 |
| 5,151,307 | A * | 9/1992 | Jackson | B60R 13/06 156/244.11 |
| 5,373,672 | A * | 12/1994 | Schulz | B32B 17/10045 52/208 |
| 5,411,785 | A * | 5/1995 | Cook | B29C 47/0004 428/122 |
| 5,529,650 | A * | 6/1996 | Bowers | B05D 1/14 156/244.11 |
| 5,636,936 | A * | 6/1997 | Kremser | A01G 9/1476 403/282 |
| 5,806,261 | A * | 9/1998 | Huebner | E04B 2/7407 52/283 |
| 6,260,254 | B1 * | 7/2001 | Mueller | B60J 10/265 29/450 |
| 6,401,397 | B2 * | 6/2002 | Klein | B60R 13/06 49/475.1 |
| 6,514,604 | B2 * | 2/2003 | Gopalan | B60J 10/17 428/122 |
| 6,968,649 | B2 * | 11/2005 | Van Den Oord | B60J 10/248 49/490.1 |
| 7,152,374 | B2 * | 12/2006 | Gopalan | B29C 47/0004 49/506 |
| D665,537 | S * | 8/2012 | Gustavsson | D29/113 |

OTHER PUBLICATIONS

Take a look at Rubbercraft's Company Brochure, Apr. 2016, http://www.rubbercraft.com/wp-content/uploads/2016/04/rubbercraftbrochure.pdf.
"Window rubber trim," Rubber Seal, Aug. 5, 2016, http://www.sealrubberstrip.com/window-rubber-trim.html.
Alan Hitchcox, "Sealed Shut," Oct. 6, 2014, http://hydraulicspneumatics.com/seals/sealed-shut.
"China Manufacturer of Bulb Trim Seals EPDM," TradeKorea.com, 2016, http://www.tradekorea.com/product/detail/P512557/China-Manufacturer-of-Bulb-Trim-Seals-EPDM.html.
"Rubber edge trim for car window," China Excellent Source Co., 2016, http://www.epdmsealstrip.com/rubber-edge-trim-for-car-window.html.
"Rubber Edge Trim Seals," Jan. 6, 2016, http://www.ohiorubberproducts.com/rubber-edge-trim-seals/.

* cited by examiner

POSITIONING THE SEAL AROUND AN EDGE PORTION OF THE WINDOW SUCH THAT THE FIRST END ABUTS AN INNER SURFACE OF THE LAMINATED WINDOW AND THE SECOND END ABUTS AN OUTER SURFACE OF THE LAMINATED WINDOW — 602

AFTER POSITIONING THE SEAL AROUND THE EDGE PORTION OF THE LAMINATED WINDOW, SECURING THE LAMINATED WINDOW WITHIN A CHANNEL OF A FRAME — 604

FIG. 6

IDENTIFYING A PARTICULAR CORNER OF THE CONNECTION PORTION THAT IS CONFIGURED TO ABUT AN OUTER EDGE PORTION OF THE LAMINATED WINDOW — 702

POSITIONING THE SEAL AROUND THE EDGE PORTION OF THE LAMINATED WINDOW SUCH THAT THE PARTICULAR CORNER ABUTS THE OUTER EDGE PORTION OF THE LAMINATED WINDOW — 704

FIG. 7

SINGLE PIECE REDUNDANT, BI-DIRECTIONAL, SEAL DAMAGE PREVENTION PRESSURE SEAL

GOVERNMENT LICENSE RIGHTS

This invention was made with government support under CCTS awarded by NASA. The government has certain rights in the invention.

FIELD

The present disclosure relates generally to mechanical seals, and more particularly, to seals for windows of a vehicle.

BACKGROUND

A window on a vehicle may include one or more seals that are positioned between the window and a frame of the vehicle. The seals may be designed to prevent air or liquid from passing between the window and the frame. By way of example, a vehicle may include a frame having a channel that is configured to hold a window. In order to seal at least one known window, a first seal (e.g., a mechanical gasket or other type of seal) is positioned between an inner surface of the window and the frame and, similarly, a second seal is positioned between an outer surface of the window and the frame.

When a vehicle operates in a pressurized environment, the effectiveness of such seals may depend upon the ability of the seals to prevent leakage while under compression. For instance, on a spacecraft, positive pressure within a cabin of the spacecraft that is greater than the pressure in the spacecraft's environment pushes a window outwards against a frame of the vehicle and, in turn, compresses a seal positioned between an outer surface of the window and the frame. If the seal is unable to withstand the compression, leakage may occur between the window and the frame. In other examples, positive pressure in a vehicle's environment that is greater than the pressure within the vehicle pushes a window inwards against a frame of the vehicle, and in turn, compresses a seal positioned between an inner surface of the window and the frame.

SUMMARY

In one example, a seal for use with a laminated window is described. The seal includes a first end formed from a first material and a second end formed from the first material, with the first material being compressible when a pressure force is applied to the first material. The seal also includes a connection portion positioned between the first end and the second end. At least some of the connection portion is formed from a second material having a greater indentation hardness than an indentation hardness of the first material.

In another example, a window system is described. The window system includes a frame having a first leg and a second leg, with the first leg and the second leg defining a channel therebetween. The window system also includes a laminated window having an edge portion positioned in the channel. In addition, the window system includes a seal positioned between the edge portion of the laminated window and the channel. The seal includes a first end formed from a first material and a second end formed from the first material, with the first material being compressible when a pressure force is applied to the first material. The seal also includes a connection portion positioned between the first end and the second end. At least some of the connection portion is formed from a second material having a greater indentation hardness than an indentation hardness of the first material.

In still another example, a method for installing a seal for a laminated window is described. The seal includes a first end formed from a first material, a second end formed from the first material, and a connection portion positioned between the first end and the second end. At least some of the connection portion is formed from a second material having a greater indentation hardness than an indentation hardness of the first material. The method includes positioning the seal around an edge portion of the laminated window such that the first end abuts an inner surface of the laminated window and the second end abuts an outer surface of the laminated window. The method also includes, after positioning the seal around the edge portion of the window, securing the laminated window within a channel of a frame.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are seals for windows of a vehicle as well as methods for installing seals for windows of a vehicle. One example seal includes a first end and a second end that are each formed from a first material, as well as a connection portion that is positioned between the first end and the second end. The seal may be configured to be wrapped around a perimeter of a window, with the first end being positioned against either the inner or outer surface of the window, and the second end positioned against the opposite surface of the window.

As described further below, at least some of the connection portion is formed from a second material having an indentation hardness that is harder than an indentation hardness of the first material. Advantageously, with this configuration, the connection portion can prevent or limit the first end and/or the second end from being over-compressed when a pressure force is applied to the window. Limiting the compression of the first end and/or the second end can help to maintain sealing functionality on the inner surface and the outer surface of the window. For instance, the first and second ends of the seal may be positioned against the outer and inner surfaces of a window, respectively, and a pressure force may be applied to the inner surface of the window. The connection portion may be configured such that the pressure force cannot compress the first end of the seal to such an extent that the first end of the seal is damaged or the second end of the seal disengages from the inner surface of the window. The seals described herein may also be configured to maintain sealing functionality under relaxed conditions (e.g., when the atmospheric pressure on each side of the window is about the same).

In some examples, the seals described herein may be manufactured as single-piece seals that are formed by co-processing two different rubbers. For instance, a first end and a second end of a seal may be molded from a first rubber, and the first and second ends may be combined or joined to a second rubber that is harder than the first rubber. Co-processing the two different rubbers may yield a seal that is stronger and has less potential points of failure than a seal that is formed by, for example, gluing different pieces of rubber together.

Further, as single-piece seals, the seals described herein are easier to install than multi-piece seals, which may have multiple gaskets (e.g. O-rings) that are configured to be positioned within grooves in a frame of a vehicle. For instance, during installation, a seal that is manufactured in accordance with the present disclosure may be wrapped around a perimeter of a window, and then the seal and the window may be installed into a frame of a vehicle as a single unit, without having to glue or otherwise fasten the seal to the window or the frame and without having to position individual gaskets within grooves in the frame of the vehicle. Since the seals described herein adhere to windows without any restraining mechanism, the seals also eliminate the need to machine or otherwise create grooves within frames of vehicles for holding the seals in place.

Various other features of the seals and methods for installing the seals are also described hereinafter with reference to the accompanying figures.

Figure 1:
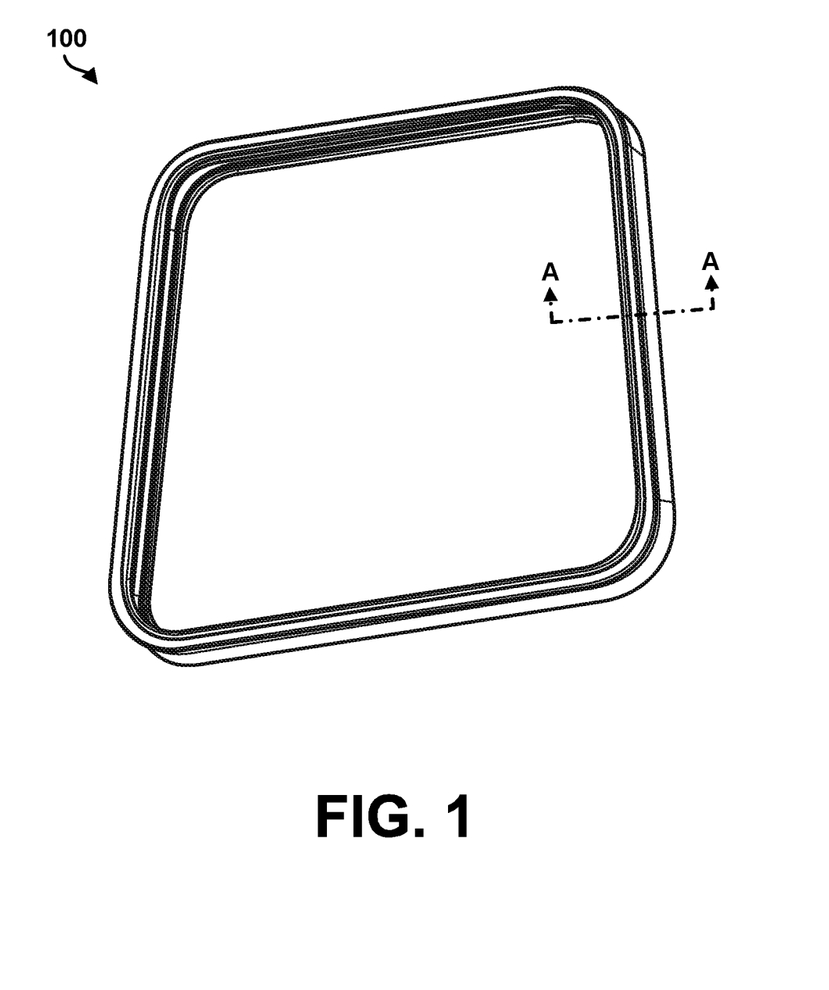
FIG. 1 illustrates a view of an example seal, according to an example embodiment.

Referring now to FIG. 1, an example seal 100 for a window is illustrated. In particular, FIG. 1 illustrates the seal 100 as having a trapezoidal-shape and being configured to be positioned around the perimeter of a trapezoidal window. In practice, the shape of the seal may vary depending on the shape of the window for which the seal is designed. For instance, for a circular window, the seal may have a circular shape. Thus, the example is not meant to be limiting. Further, as shown in FIG. 1, the seal 100 is a single-piece seal.

Figure 2:
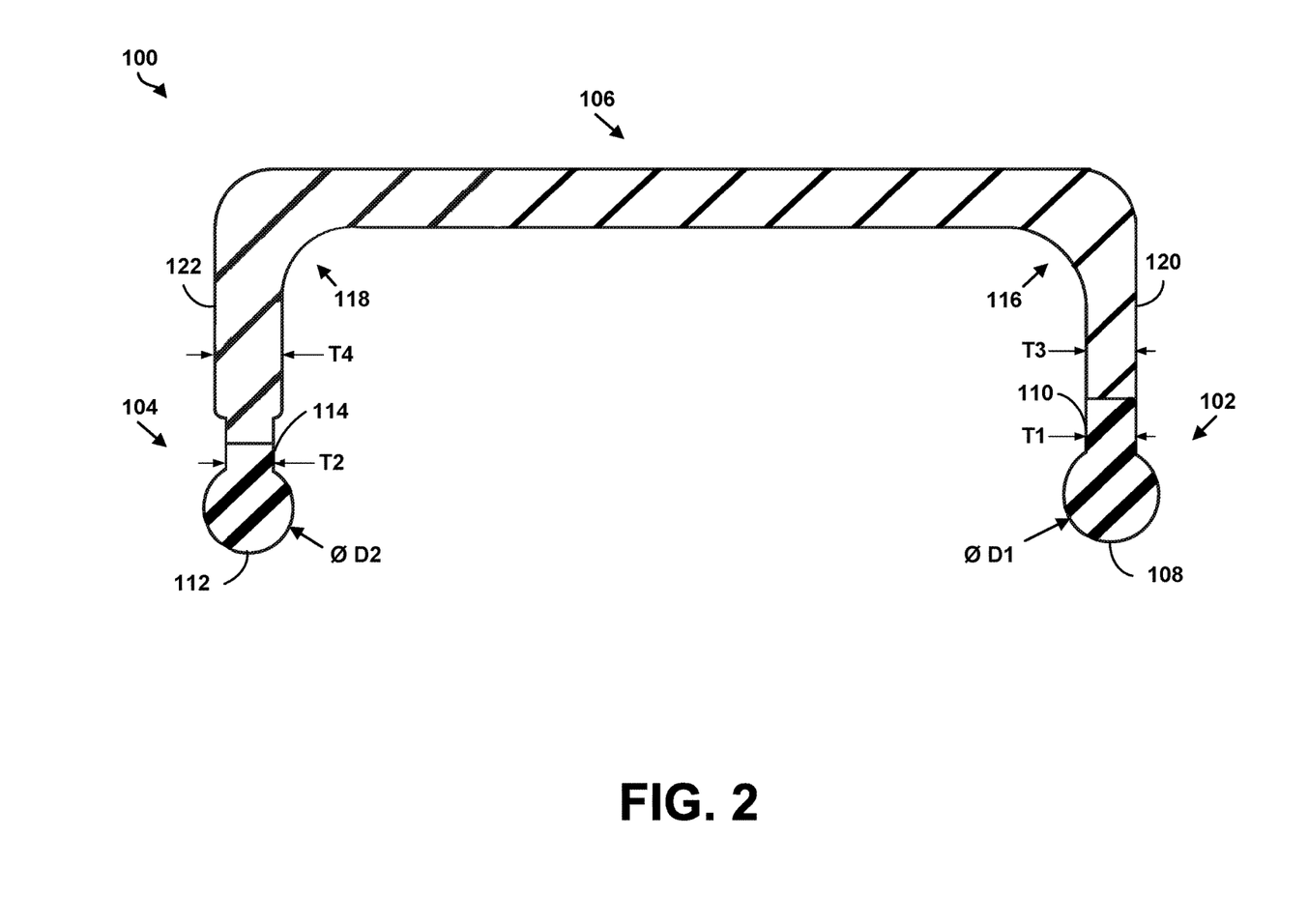
FIG. 2 illustrates a partial cross-sectional view of the example seal of FIG. 1.

FIG. 2 illustrates a partial cross-sectional view of the seal 100, shown along line A of FIG. 1. As shown in FIG. 2, the seal 100 includes a first end 102 and a second end 104, with a connection portion 106 extending between the first end 102 and the second end 104.

In line with the discussion above, the first end 102 and the second end 104 are formed of a first material, and at least some of the connection portion 106 is formed of a second material having a greater indentation hardness than the first material. Although FIG. 2 illustrates all of the connection portion 106 as being formed from the second material, the example is not meant to be limiting. In other examples, only a portion of the connection portion 106 may be formed from the second material, with the remainder of the connection portion 106 being formed from the first material.

In one example, the first material may be a first rubber and the second material may be a second rubber having a greater indentation hardness than the first rubber. For instance, the first rubber may have a Shore hardness of about 50-60 A, and the second rubber may have a Shore hardness of about 80 A. As another example, the first rubber may have a Shore hardness between 30-70 A, and the second rubber may have a Shore hardness that is greater than 70 A (e.g., 70-100 A). As still another example, the first rubber may have a Shore hardness of about 40 A, and the second rubber may have a Shore hardness of about 85 A. Many variances exist, depending on the type of rubber used. In addition, the indentation hardnesses of the first material and the second material may vary depending on the pressure forces that a window for which the seal is designed is expected to incur. For instance, the indentation hardnesses of the first material and the second material may vary depending on the pressure forces that are expected for an environment of a vehicle in which the window is configured to be installed.

As further shown in FIG. 2, the first end 102 includes a first seal bead 108 and a first transition portion 110 connecting the first seal bead 108 to the connection portion 106. Similarly, the second end 104 includes a second seal bead 112 and a second transition portion 114 connecting the second seal bead 112 to the connection portion 106.

The first seal bead 108 and the second seal bead 112 may be made of the first material discussed above. For instance, the first seal bead 108 and the second seal bead 112 may be made of the first rubber. As such, the first seal bead 108 and the second seal bead 112 may have the same indentation hardness. Alternatively, in another example, the first seal bead 108 and the second seal bead 112 may be made of two different materials having two different indentation hardnesses, with the two indentation hardnesses being less than an indentation hardnesses of the second material discussed above from which at least some of the connection portion 106 is formed.

The first seal bead 108 and the second seal bead 112 each have a circular-shaped cross-section. Further, the first transition portion 110 has a thickness T1 that is small than a diameter D1 of the first seal bead 108, and the second transition portion 112 has a thickness T2 that is smaller than a diameter of the second seal bead 112.

In one example, the diameter D1 of the first seal bead 108 may be the same as the diameter D2 of the second seal bead 112. Alternatively, in other examples, the diameter D1 of the first seal bead 108 may be different from (e.g., larger or smaller than) the diameter D2 of the second seal bead 112. For instance, if an inner surface of a window is expected to experience larger pressure forces than an outer surface of the window, the seal bead that is configured to abut the inner surface may have a larger diameter than the other seal bead. This configuration may allow the seal bead that is configured to abut the inner surface to maintain sealing functionality between the inner surface and a frame when the inner surface of the window is pressed outwards. Likewise, if an outer surface of a window is expected to experience larger pressure forces than an inner surface of the window, the seal bead that is configured to abut the outer surface may have a larger diameter than the other seal bead.

Further, the connection portion 106 includes a first corner 116 and a second corner 118. In one example, the first corner 116 may be configured to abut an inner edge portion of a window, and the second corner 118 may be configured to abut an outer edge portion of the window. Alternatively, in other example, the first corner 116 may be configured to abut an outer edge portion of a window, and the second corner 118 may be configured to abut an inner edge portion of the window.

The first corner 116 includes a first section 120 that is connected to the first end 102, and the second corner 118 includes a second section 122 that is connected to the second end 104. The first section 120 has a thickness T3 and the second section 122 has a thickness T4. As shown in FIG. 2, the thickness T3 is smaller than the diameter D1 of the first seal bead 108, and the thickness T4 is smaller than the diameter D2 of the second seal bead 112. This arrangement enables the seal 100 to maintain sealing functionality in relaxed conditions (e.g., when the atmospheric pressure on each side of the window is about the same).

The thickness T4 of the second section 122 may be sized to limit compression of the second seal bead 112 to between about 20% to about 30%. For instance, the thickness T4 of the second section 122 may be about 70% to about 80% of the diameter D2. In one example, after the second seal bead 112 is compressed such that the diameter D2 is reduced by 20-30%, the thickness T4 of the second section 122 may prevent or limit further compression of the second seal bead 112. With this arrangement, the thickness T4 of the second section 122 may allow the second seal bead 112 to be compressed to some extent (e.g., 0-20%) to provide a sufficient seal. Additionally, with this arrangement, the thickness T4 of the second section 122 may prevent the second seal bead 112 from compressing to a point where the second seal bead 112 is at risk of being permanently deformed.

Similarly, the thickness T3 of the first section 120 may be sized to limit compression of the first seal bead 108 to between about 20% to about 30% when a pressure force is applied.

In one example, the thickness T3 of the first section 120 may be the same as the thickness T4 of the second section 122. Such an arrangement may be appropriate if the seal 100 is designed to seal a window that is expected to experience roughly the same amount of pressure forces on each side of the window. Alternatively, in other examples, thickness T3 of the first section 120 may be different from (e.g., larger or smaller than) the thickness T4 of the second section 122. For instance, if an inner surface of a window is expected to experience larger pressure forces than an outer surface of the window, the thickness of the section that is configured to abut the outer surface of the window may be larger than the thickness of the other section, such that the thicker section prevents over-compression of the seal bead that is configured to abut the outer surface of the window. Likewise, if an outer surface of a window is expected to experience larger pressure forces than an inner surface of the window, the section that is configured to abut the inner surface of the window may have a larger thickness than the other section.

Figure 3:
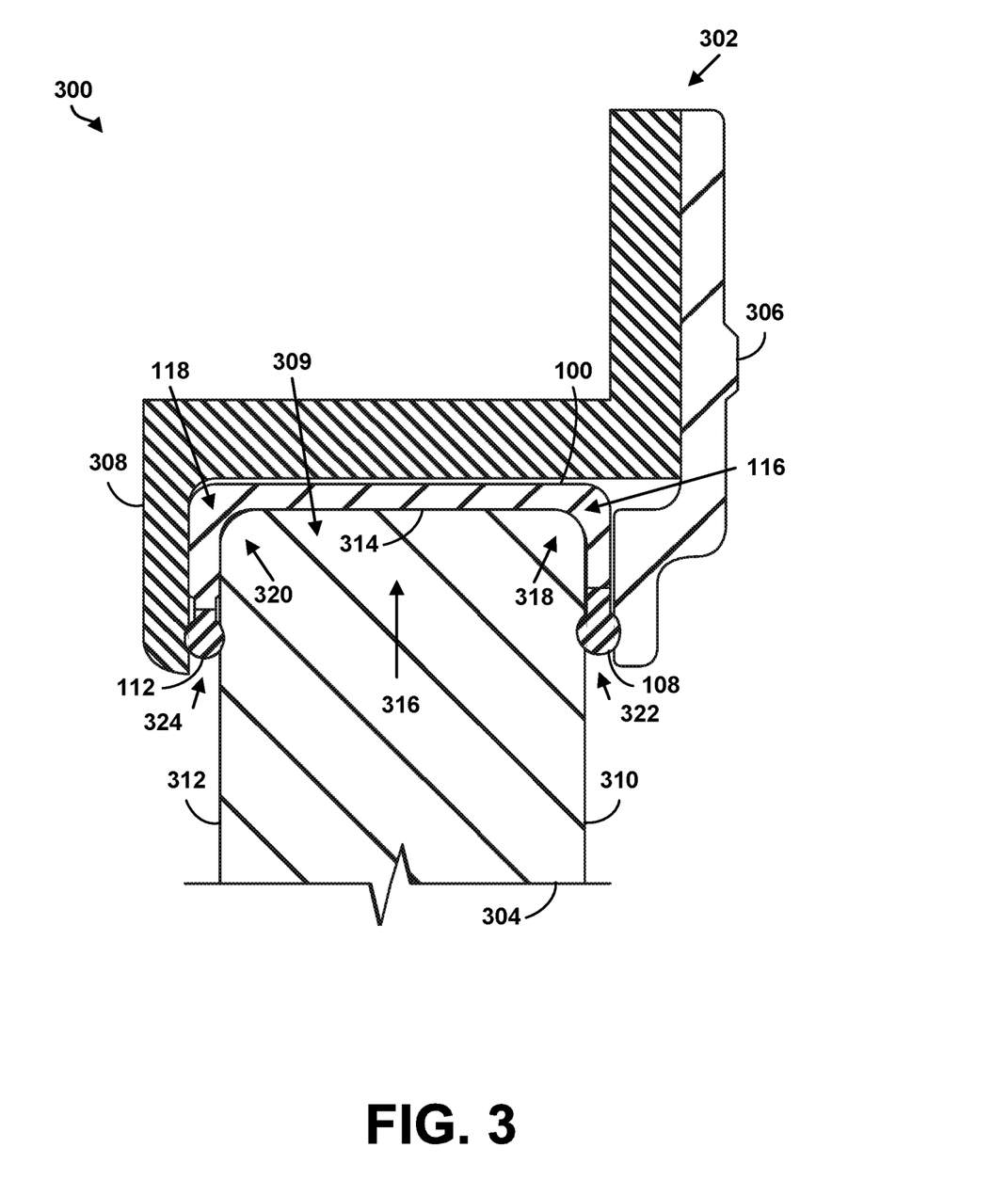
FIG. 3 illustrates a partial cross-sectional view of an example window system, including the example seal of FIGS. 1 and 2.
Figure 4:
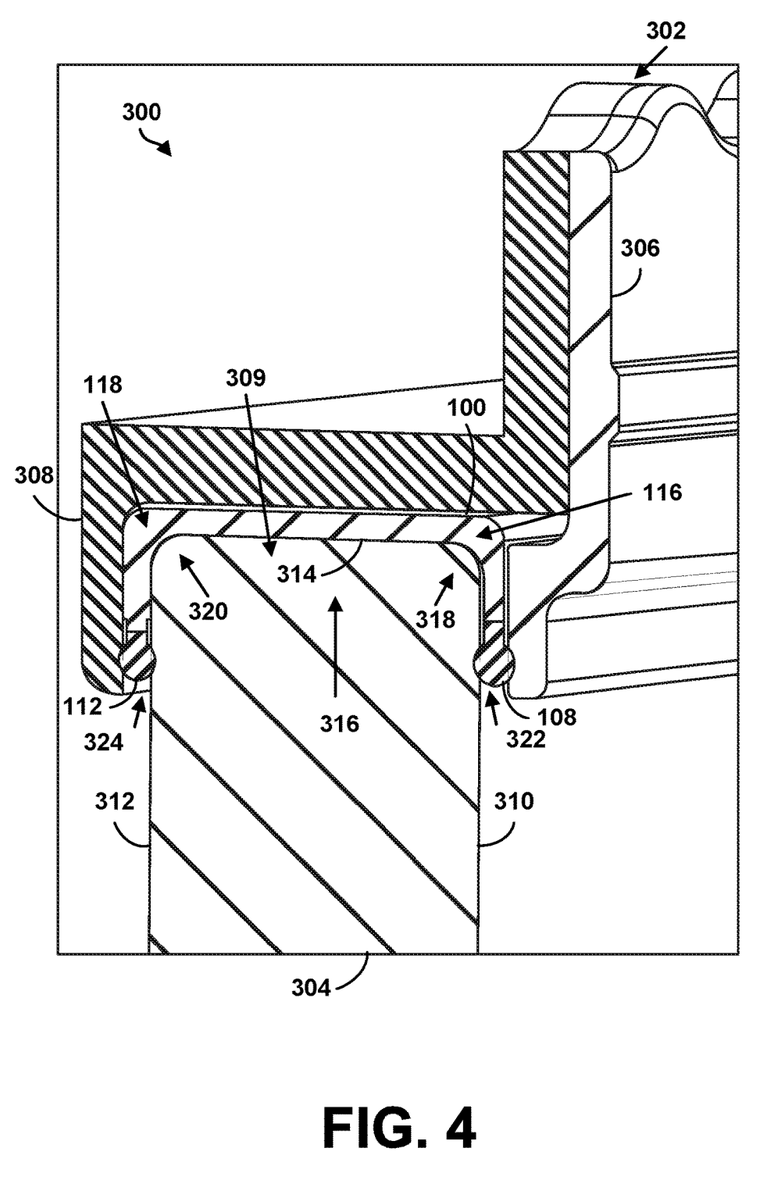
FIG. 4 illustrates another partial cross-sectional view of the example window system of FIG. 3.

FIG. 3 illustrates a partial cross-sectional view of an example window system 300 in which the seal 100 is installed. And FIG. 4 illustrates a different partial cross-sectional view of the example window system 300 of FIG. 3. The window system 300 may be a window system for a vehicle (not shown), such as a window system for a spacecraft for example. Alternatively, the window system 300 may be a window system for another type of aerial vehicle, or a window system for a marine or terrestrial vehicle.

As shown in FIGS. 3 and 4, the window system 300 includes a frame 302 that is configured to hold a window 304. The frame 302 includes a first leg 306 and a second leg 308, with the first leg 306 and the second leg 308 defining a channel 309 therebetween. The window 304 may be any type of window, such as a laminated window for example. The window 304 includes an inner surface 310, an outer surface 312, and a side surface 314. The inner surface 310 is exposed to an interior of a vehicle, and the outer surface 312 is exposed to an exterior of a vehicle. The side surface 314 connects the inner surface 310 and the outer surface 312.

As shown in FIGS. 3 and 4, an edge portion 316 of the window 304 is positioned within the channel. The edge portion 316 includes an inner edge portion 318 and an outer edge portion 320. The inner edge portion 318 includes part of the inner surface 310 and part of the side surface 314. The outer edge portion 320 includes part of the outer surface 312 and part of the side surface 314.

As further shown in FIGS. 3 and 4, the seal 100 is positioned in an inner gap 322 defined between the inner surface 310 and the first leg 306 and in an outer gap 324 defined between the outer surface 312 and the second leg 308. With such an arrangement, the first corner 116 of the seal 100 abuts the inner edge portion 318 of the window 304, and the second corner 118 of the connection portion 106 abuts the outer edge portion 320 of the window 304.

In line with the discussion above, the seal 100 is configured to maintain sealing functionality between the frame 302 and the window 304. More specifically, the seal 100 is configured to maintain sealing functionality on the inner surface 310 and the outer surface 312 of the window 304, when a pressure force is not applied to either one of the inner surface 310 and the outer surface 312 and when a pressure force is applied to either one of the inner surface 310 and the outer surface 312.

For instance, when the first leg 306 and the second leg 308 are secured together, the first seal bead 108 may be compressed between the first leg 306 and the inner surface 310, and the second seal bead 112 may be compressed between the second leg 308 and the outer surface 312. Such compression of the first seal bead 108 and the second seal bead 112 provides a seal between the first leg 306 and the inner surface 310 as well as between the second leg 308 and the outer surface 312.

Further, when a pressure force is applied to the inner surface 310, the thickness of the second corner 118 of the seal 100 may limit over-compression of the second seal bead 112. Limiting over-compression of the second seal bead 112 may help to prevent the second seal bead 112 from being permanently deformed due to over-compression, for example. Limiting over-compression of the second seal bead 112 may also limit movement of the window 304 outwards (i.e. to the left in FIG. 3) such that the first seal bead 108 does not disengage from the from the first leg 306 or the inner surface 310, for example. Similarly, when a pressure force is applied to the outer surface 312, the thickness of the first corner 116 of the seal 100 may limit over-compression of the first seal bead 108 and/or movement of the window 304 inwards (i.e. to the right in FIG. 3).

Figure 5:
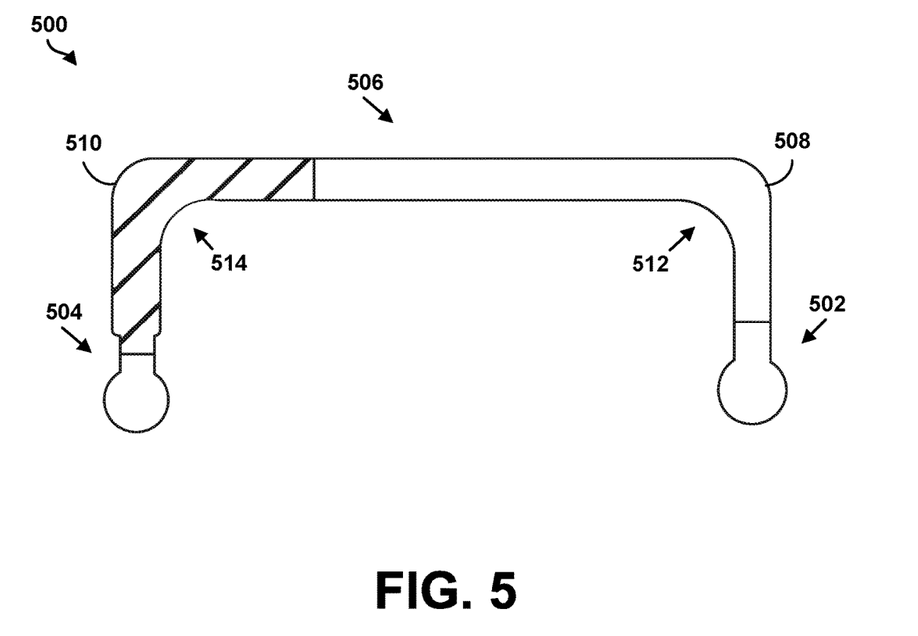
FIG. 5 illustrates a partial cross-sectional view of another seal, according to an example embodiment.

FIG. 5 illustrates a partial cross-sectional view of another seal 500. Like the example seal 100 of FIGS. 1-4, the seal 500 includes a first end 502 and a second end 504, with a connection portion 506 extending between the first end 502 and the second end 504. In line with the discussion above, the first end 502 and the second end 504 may be formed of a first material. However, unlike the seal 100 of FIGS. 1-4, only a portion of the connection portion 506 is formed from a second material having an indentation hardness that is greater than in indentation hardness of the first material.

Specifically, with reference to FIG. 5, a first portion 508 of the connection portion 506 that is connected to the first end 502 may be formed of the first material, while a second portion 510 of the connection portion extending between the first portion 508 and the second end 504 may be formed of the second material. The first portion 508 includes a first corner 512 that is configured to abut a first edge portion of a window. And the second portion 510 includes a second corner 514 that is configured to abut a second edge portion of a window. For instance, in one example, the first corner 512 may be configured to abut an inner edge portion of a window, and the second corner 514 may be configured to abut an outer edge portion of the window. Alternatively, in other example, the first corner 512 may be configured to abut an outer edge portion of a window, and the second corner 514 may be configured to abut an inner edge portion of the window. Thus, depending on an example application, a length of the second portion 510 may comprise less than half a length of the seal 500 as shown in FIG. 5. The seal 100 in the window system 300 (shown in FIGS. 3 and 4) can be replaced with the seal 500, depending on the application of the window system 300. When the seal 500 is used with the window system 300, the seal 500 functions similarly to the seal 100.

Figure 6:
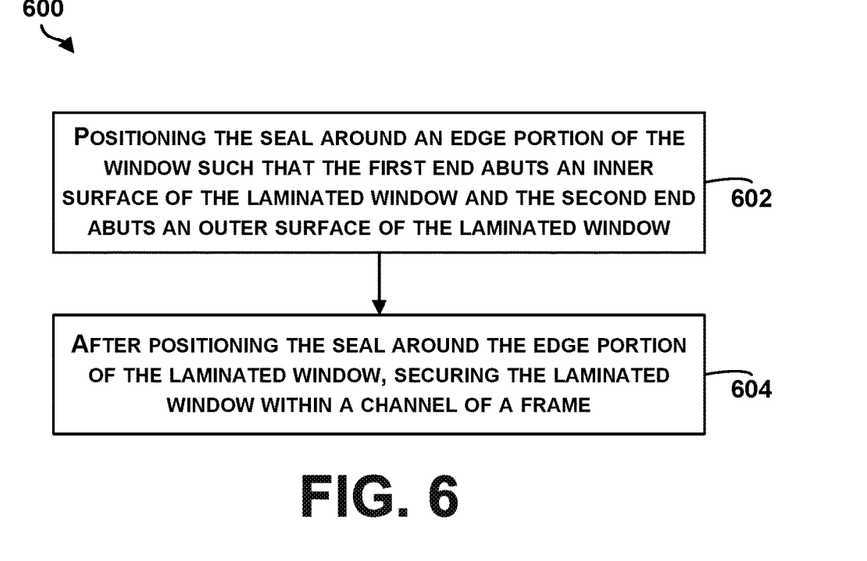
FIG. 6 shows a flowchart of an example method, according to an example embodiment.

FIG. 6 shows a flowchart of an example method 600 for installing a seal, such as the seal 100 (shown in FIGS. 1-4) or the seal 500 (shown in FIG. 5), for a laminated window, such as the window 304 (shown in FIGS. 3 and 4). Method 600 shown in FIG. 6 presents an embodiment of a method that, for example, could be carried out by an operator and/or a robotic device. For instance, the method could be carried out while assembling or repairing a vehicle. Further, the seal that is installed could be any of the seals 100 and/or 500 described herein. For instance, the seal includes a first end formed from a first material, a second end formed from the first material, and a connection portion positioned between the first end and the second end, with at least some of the connection portion being formed from a second material having a greater indentation hardness than an indentation hardness of the first material.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Referring to FIGS. 3-6, at block 602, the method 600 includes positioning the seal 100, 500 around an edge portion 316 of the window 304 such that the first end 102, 502 abuts an inner surface 310 of the laminated window 304 and the second end 104, 504 abuts an outer surface 312 of the laminated window 304. And at block 604, the method 600 includes, after positioning the seal 100, 500 around the edge portion 316 of the laminated window 304, securing the laminated window 304 within a channel 309 of a frame 302.

In line with the discussion above, the seal 100, 500 may include a first corner that is configured to abut an inner edge portion of the laminated window and a second corner that is configured to abut an outer edge portion of the laminated window. Accordingly, positioning the seal 100, 500 around the edge portion of the window may involve positioning the seal such that the first corner abuts the inner edge portion of the laminated window and the second corner abuts the outer edge portion of the laminated window.

In one example, positioning the seal 100, 500 around the edge portion of the window may involve fitting part of the seal around part of a perimeter of the laminated window, and then temporarily stretching another part of the seal in order to fit the rest of the seal around the perimeter of the window. In some examples, the first material and the second material may be at least partially resilient, such that once the seal is positioned around the edge portion of the laminated window, the seal adheres to the laminated window without use of any type of adhesive or restraining mechanism.

Figure 7:
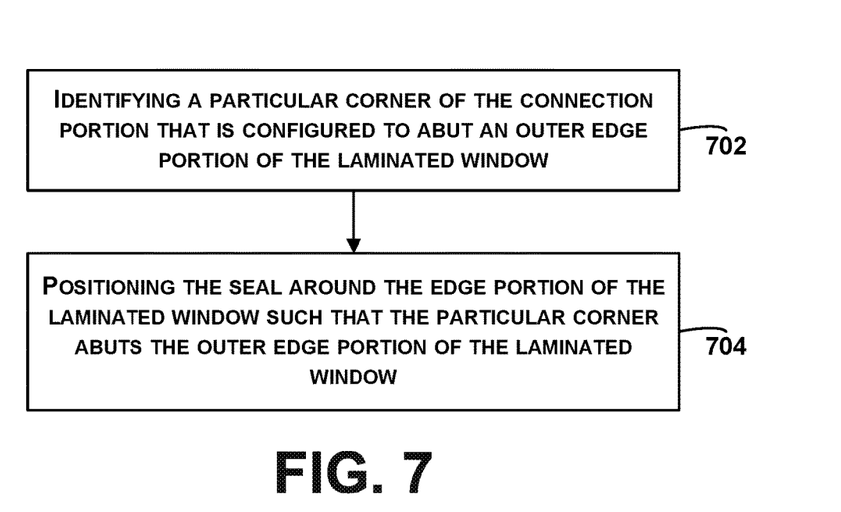
FIG. 7 shows a flowchart of another example method for use with the method shown in FIG. 6, according to an example embodiment.

FIG. 7 shows a flowchart of another example method for use with the method 600 shown in FIG. 6. In particular, FIG. 7 shows a flowchart of an example method that can be carried out for a seal, such as the seal 100 (shown in FIGS. 1-4) or the seal 500 (shown in FIG. 5), having a connection portion with a particular corner that is configured to abut an outer edge portion of the laminated window.

Referring to FIGS. 3-7, at block 702, FIG. 7 includes identifying a particular corner 118, 514 of the connection portion 106, 506 that is configured to abut an outer edge portion 320 of the laminated window 304. And at block 704, FIG. 7 includes positioning the seal 100, 500 around the edge portion 316 of the laminated window such that the particular corner 118, 514 abuts the outer edge portion 320 of the laminated window 304.

In one example, identifying the particular corner 118, 514 may involve identifying a distinctive marking on the particular corner of the seal, such as a distinctive color or a distinctive label. In another example, identifying the particular corner 118, 514 may involve identifying a thickest corner of two corners of the connection portion, or identifying a thinnest corner of the two corners of the connection portion. Further, in another example, identifying the particular corner 118, 514 may involve identifying a seal bead having a largest (or smallest) diameter and then identifying the corner closest to the seal bead having the largest (or smallest) diameter.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A seal for use with a window, the seal comprising:
   a first end comprising a first seal bead and a first transition portion projecting from the first seal bead;

a second end comprising a second seal bead and a second transition portion projecting from the second seal bead; and a connection portion joining the first transition portion and the second transition portion, the connection portion comprising:

a first corner comprising a first section, wherein the first section has a thickness that is smaller than a diameter of the first seal bead, and wherein the first section is connected to and parallel to the first transition portion, and a second corner comprising a second section, wherein the second section has a thickness that is smaller than a diameter of the second seal bead, and wherein the second section is connected to and parallel to the second transition portion, wherein the second end is formed from a first rubber that is compressible when a pressure force is applied, and wherein the second corner is formed from a second rubber that is separate from and joined to the first rubber, the second rubber having a greater indentation hardness than an indentation hardness of the first rubber.

2. The seal of claim 1, wherein the first corner is configured to abut an inner edge portion of the window and the second corner is configured to abut an outer edge portion of the window.

3. The seal of claim 2, wherein the first corner and the second corner of the connection portion are formed from the second rubber.

4. The seal of claim 2:

wherein the second section is thicker than the first section.

5. The seal of claim 4, wherein the diameter of the first seal bead is larger than the diameter of the second seal bead.

6. The seal of claim 1:

wherein the first transition portion has a thickness that is smaller than the diameter of the first seal bead, and wherein the second transition portion has a thickness that is smaller than the diameter of the second seal bead.

7. The seal of claim 6, wherein the first section is parallel to the second section.

8. The seal of claim 7, wherein the thickness of the second transition portion is smaller than the thickness of the second section.

9. The seal of claim 7, wherein the connection portion further comprises a center portion between the first corner and the second corner, and wherein the first section and the second section are orthogonal to the center portion.

10. The seal of claim 1, wherein the thickness of the first section and the thickness of the second section limit compression of the first seal bead and the second seal bead, respectively, to between about 20% to about 30% when the pressure force is applied.

11. The seal of claim 1, wherein the second rubber has a Shore hardness of about 80 A.

12. The seal of claim 1, wherein the seal is a single-piece seal formed by co-processing the first rubber and the second rubber.

13. A window system comprising:

a frame having a first leg and a second leg, the first leg and the second leg defining a channel therebetween;

a window having an edge portion positioned in the channel; and a seal positioned between the edge portion of the window and the channel, the seal comprising:

a first end comprising a first seal bead and a first transition portion projecting from the first seal bead, a second end comprising a second seal bead and a second transition portion projecting from the second seal bead, and a connection portion joining the first transition portion and the second transition portion, the connection portion comprising:

a first corner comprising a first section, wherein the first section has a thickness that is smaller than a diameter of the first seal bead, and wherein the first section is connected to and parallel to the first transition portion, and a second corner comprising a second section, wherein the second section has a thickness that is smaller than a diameter of the second seal bead, and wherein the second section is connected to and parallel to the second transition portion, wherein the second end is formed from a first rubber that is compressible when a pressure force is applied, and wherein the second corner is formed from a second rubber that is separate from and joined to the first rubber, the second rubber having a greater indentation hardness than an indentation hardness of the first rubber.

14. The window system of claim 13:

wherein the window has an inner surface and an outer surface, and wherein the seal is positioned in an inner gap defined between the inner surface and the first leg and in an outer gap defined between the outer surface and the second leg.

15. The window system of claim 14, wherein the seal is configured to maintain sealing functionality on the inner surface and the outer surface of the window when the pressure force is not applied and when the pressure force is applied.

16. The window system of claim 13, wherein the first corner is configured to abut an inner edge portion of the window and the second corner is configured to abut an outer edge portion of the window.

17. The window system of claim 16, wherein the first corner and the second corner of the connection portion are formed from the second rubber.

18. The window system of claim 13, wherein the frame is part of a spacecraft.

19. A method for installing a seal for a window, wherein the seal comprises a first end comprising a first seal bead and a first transition portion projecting from the first seal bead, a second end comprising a second seal bead and a second transition portion projecting from the second seal bead, and a connection portion joining the first transition portion and the second transition portion, the connection portion comprising (i) a first corner comprising a first section, wherein the first section has a thickness that is smaller than a diameter of the first seal bead, and wherein the first section is connected to and parallel to the first transition portion, and (ii) a second corner comprising a second section, wherein the second section has a thickness that is smaller than a diameter of the second seal bead, and wherein the second section is connected to and parallel to the second transition portion, wherein the second end is formed from a first rubber that is compressible when a pressure force is applied, and wherein the second corner is formed from a second rubber that is separate from and joined to the first rubber, the second rubber having a greater indentation hardness than an indentation hardness of the first rubber, the method comprising:

positioning the seal around an edge portion of the window such that the first end abuts an inner surface of the window and the second end abuts an outer surface of the window; and after positioning the seal around the edge portion of the window, securing the window within a channel of a frame.

20. The method of claim 19, wherein the second corner is configured to abut an outer edge portion of the window, the method further comprising:

identifying the second corner of the connection portion of the seal, wherein positioning the seal around the edge portion of the window comprises positioning the seal around the edge portion of the window such that the second corner abuts the outer edge portion of the window.

\* \* \* \* \*

UNITED STATES PATENT AND TRADEMARK OFFICE
CERTIFICATE OF CORRECTION

PATENT NO. : 10,174,843 B1  
APPLICATION NO. : 15/397671  
DATED : January 8, 2019  
INVENTOR(S) : Drew L. Smallwood Page 1 of 1

It is certified that error appears in the above-identified patent and that said Letters Patent is hereby corrected as shown below:

In the Specification

On Column 1, Line 8: please delete "CCTS" and insert -- NNK14MA75C -- before "awarded".

Signed and Sealed this
Twenty-ninth Day of October, 2019

Andrei Iancu
*Director of the United States Patent and Trademark Office*